UNITED STATES PATENT OFFICE.

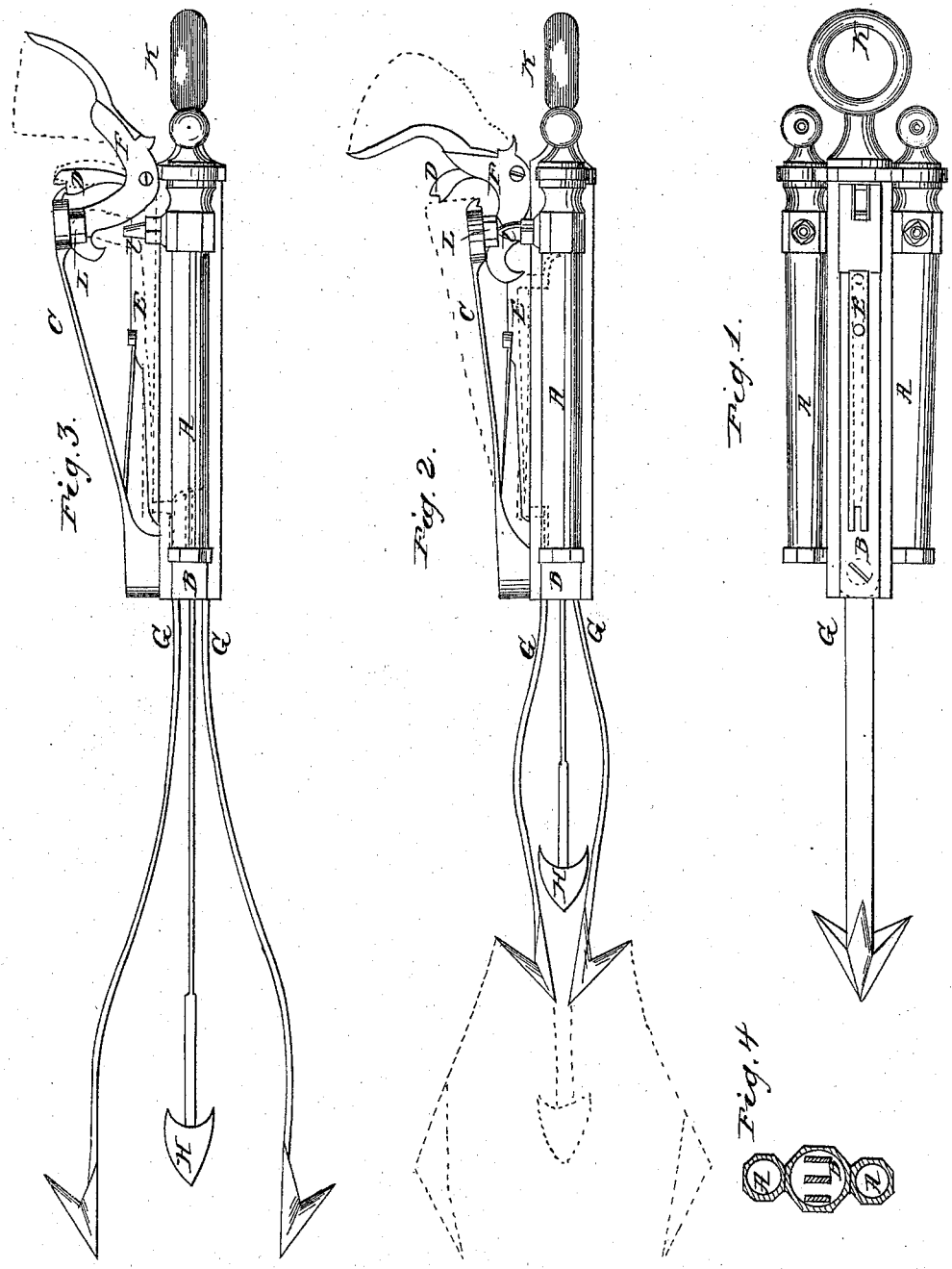

FREIDRICK REUTHE, OF HARTFORD, CONNECTICUT.

TRAP FOR ANIMALS.

Specification of Letters Patent No. 17,297, dated May 12, 1857.

*To all whom it may concern:*

Be it known that I, FREIDRICK REUTHE, of the city of Hartford, county of Hartford, and State of Connecticut, have invented a new and useful Trap for Capturing and Destroying Wild Animals; and I do hereby declare the following to be a correct description thereof, reference being had to the accompanying drawing and to the letters of reference marked thereon.

The nature of my invention consists in peculiar sliding and expanding springs with barbs or fangs, in combination with exploding barrels.

To enable others skilled in the art to make and use my invention I will proceed to describe its construction and operation.

*The drawing.*—Figure 1 is a plan view with the main spring removed to show the barrels, nipples, &c.; Fig. 2 a side view, as the springs and other parts appear before being baited and set for operation; Fig. 3 side view with position of springs when discharged also as cocked before being discharged; Fig. 4 end view showing muzzles.

Letter A represents the exploding barrels, B barrel or chamber to contain the springs, C main spring, D notched head of lever E, E lever to actuate the notched head D, F trigger, G sliding and expanding springs, H center spring for bait, K ring to suspend the trap, L nipples and caps.

The barrels A A I make of any required size or power, formed similar to pistol barrels or small cannon, with proper nipples and touch holes for percussion caps—these barrels are intended to be loaded with powder and ball.

The middle spring chamber B I make of sufficient capacity to receive the springs G and H. On the top part of this chamber B there is a slot running from breech to muzzle for a pin attached to the springs G which slides along the slot and in a groove in the lever E. This lever E is grooved on the underside deepest at the back end, so that when the pin of the springs slides along it raises the front end of the lever throwing back the end at D which supports the main spring C in a notch, relieves the same and allows the spring hammers to fall with force on the percussion caps on the nipples causing the charge to explode in the barrels.

The trigger F is merely to raise up the main spring to cock the trap preparatory to being set.

The middle barbed spear spring H is to fasten the bait on, so as to be independent of the expanding spring fangs G and allow them to open freely when drawn out by animal pulling on the bait.

This animal trap can be made of any size or strength required for the capture or destruction of small or large animals.

To operate the trap, a suitable bait is fastened on the middle spear head spring H, the trigger raises the main spring C and cocks it. A chain is passed through the ring K to suspend it to the branch of a tree or other suitable position. The victim seizes the bait and pulling it to devour it, the springs in the center barrel slide forward, the pin attached to the same raises the lever E, which throws back the head D relieving the main spring C from the notch, the hammers fall forcibly on the percussion caps causing the explosion of the barrels, A, A, and discharging the balls down the throat, at the same instant the springs expand in the animal's mouth the barbs and fangs hold him fast.

This is a very effective trap for the capture and destruction of animals where they are unapproachable by man.

What I claim as my invention and desire to secure by Letters Patent, is—

The sliding and expanding spring, barbed fangs G G and H, in combination with, one two or more exploding barrels, operating in the manner and for the purpose substantially as herein set forth and described.

FREIDRICK REUTHE.

Witnesses:
 WM. VINE,
 WM. VINE, Jr.